United States Patent
Finney

(10) Patent No.: US 6,233,840 B1
(45) Date of Patent: May 22, 2001

(54) DEVICE FOR ADDING MOISTURE TO WINDROWED HAY TO SIMULATE THE EFFECT OF DEW

(75) Inventor: Denzel R. Finney, Fort Sumner, NM (US)

(73) Assignee: Harvest Tec, Inc., Hudson, WI (US)

( * ) Notice: Subject to any disclaimer, the term of this patent is extended or adjusted under 35 U.S.C. 154(b) by 0 days.

(21) Appl. No.: 09/436,392

(22) Filed: Nov. 8, 1999

(51) Int. Cl.⁷ ...................................................... F26B 19/00
(52) U.S. Cl. .................................. 34/60; 34/186; 34/188; 34/236; 34/185; 56/16.4 A; 56/16.4 R; 56/16.8; 239/171
(58) Field of Search .............................. 34/60, 185, 186, 34/187, 241, 236, 188; 56/16.4 A, 16.4 B, 16.4 R, 16.8; 239/171

(56) References Cited

U.S. PATENT DOCUMENTS

| | | | |
|---|---|---|---|
| 3,648,935 | * | 3/1972 | Waldrum ................................ 236/659 |
| 3,731,878 | * | 5/1973 | Lubetzky et al. ..................... 239/166 |
| 3,896,613 | * | 7/1975 | Van Der Lely ......................... 56/370 |
| 3,920,184 | * | 11/1975 | Waldrum ................................ 239/10 |
| 3,968,933 | * | 7/1976 | Waldrum ............................... 239/171 |
| 4,662,163 | * | 5/1987 | Adams .................................... 56/341 |
| 4,694,991 | * | 9/1987 | Breckenridge ....................... 239/171 |
| 4,842,195 | * | 6/1989 | Koll et al. ................................ 239/1 |
| 4,873,772 | * | 10/1989 | Maher ...................................... 34/60 |
| 4,991,342 | * | 2/1991 | Maher et al. ........................... 47/1.7 |
| 5,082,186 | * | 1/1992 | Bruns .................................... 239/682 |
| 6,021,959 | * | 2/2000 | Mayfield, Jr. et al. ................ 239/67 |
| 6,050,070 | * | 4/2000 | Cook ..................................... 56/14.1 |
| 6,109,008 | * | 8/2000 | Staheli .............................. 56/10.2 B |

* cited by examiner

*Primary Examiner*—Pamela Wilson
(74) *Attorney, Agent, or Firm*—Skinner and Associates

(57) ABSTRACT

The device that has been invented, sprays water into and around a windrow of hay evenly adding moisture to dry alfalfa to allow for baling at moistures above 14% and below 18%, reducing the losses of leaves due to shatter.

7 Claims, 1 Drawing Sheet

DEVICE FOR ADDING MOISTURE TO WINDROWED HAY TO SIMULATE THE EFFECT OF DEW

SUMMARY OF THE INVENTION

Figure 1:
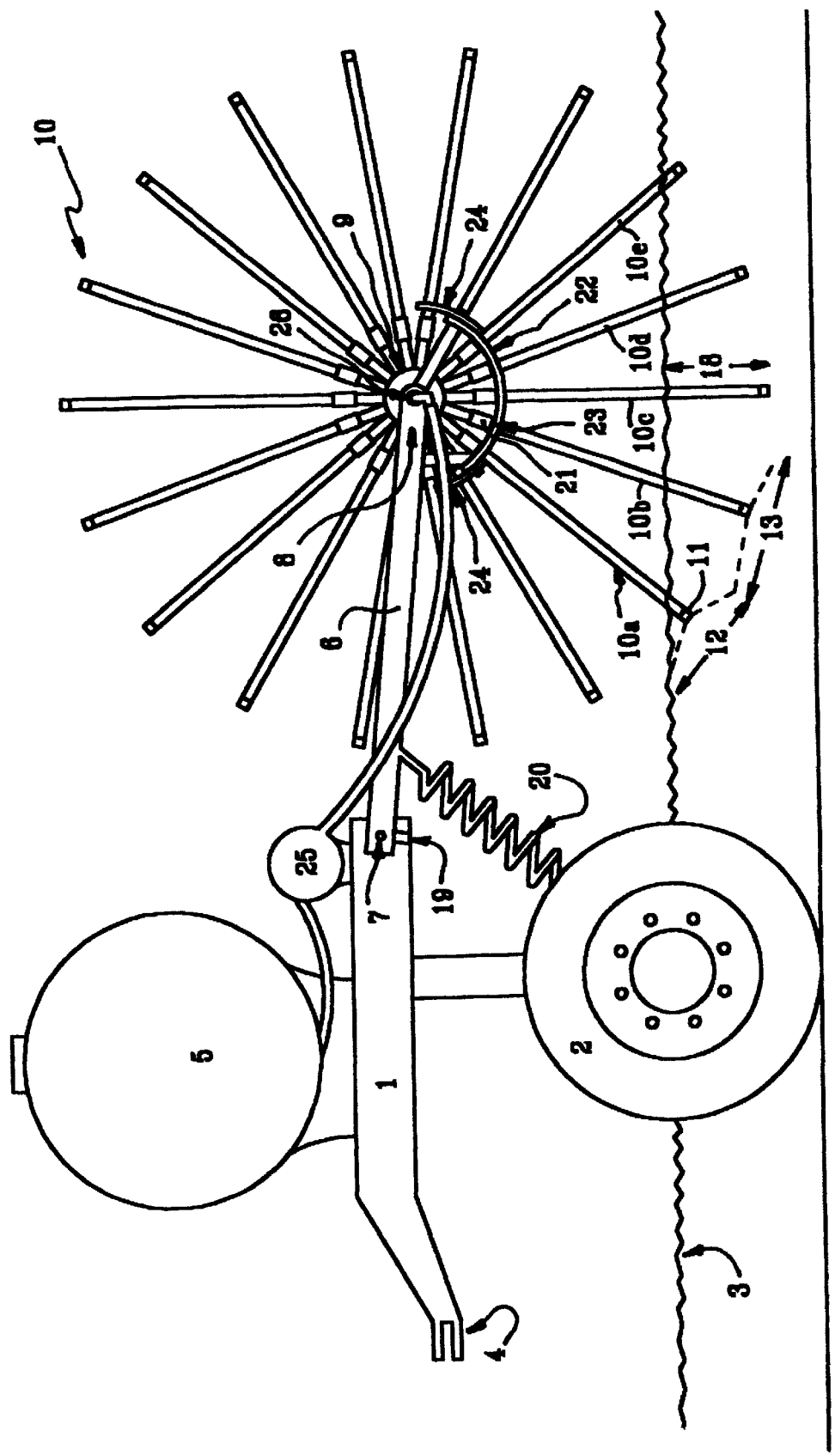

The device that has been invented, sprays moisture into the inside and around the outside of a windrow of hay laying in the field just prior to baling of the hay. Multiple spikes attached to a rotating shaft traveling over the windrow, enter the windrow and spray water evenly through the entire windrow. Moisture is therefore spread throughout the windrow without adding areas of higher and lower concentration of moisture as happens when moisture is sprayed over the top of the windrow. The effect of dew condensing into and on a windrow of hay is therefore closely duplicated with the device. In dry areas of hay production, where the condensation of dew is relied upon to bring moisture into windrowed hay for harvest, this device provides an alternative method for preparing hay for baling.

BACKGROUND OF THE INVENTION

Alfalfa hay is a major crop for the feeding of livestock. The most prevalent method of harvesting and handling alfalfa hay, is to cut the hay, lay it in windrows and let the natural elements (sun and wind) dry the hay in the windrow down to a level of moisture that is acceptable for baling. The moisture level that is acceptable for baling is set on the high end at 18% moisture due to the occurrence of mold growth that can significantly reduce the feed quality of hay harvested above that level. The low end limit is 14% moisture. Around one-half of the nutrients in alfalfa hay are in the leaves. Due to the thin structure of the leaves, below 14% moisture, they will become brittle and shatter as the windrow is mechanically handled by the hay baler. Operating within this narrow band, 18% moisture on the high side and 14% moisture on the low side, imposes significant limitations to operating time for balers of alfalfa hay.

A common practice for baling hay in the drier regions of production, is to bale at night. The alfalfa is cut and windrowed, and the windrows are allowed to dry completely, usually down to around 10% taking normally three to six days. This allows for the producer to know that all the hay in the windrow is below 18% and no spoilage will occur. Then to prevent excess leaf loss, the operator waits for the condensation of dew to occur, usually at night. As the dew evenly condenses on the warmer hay as the air temperature drops, the windrow is evenly brought up in moisture above the lower limit for acceptable baling. If the dew becomes too heavy and brings the windrow moisture up above the upper limit (18%) production must be suspended until the moisture again begins to dry off the hay. Using this technique for baling, although acceptable, is limited by the hours when the right amount of dew is in the windrow.

Producers of alfalfa have tried simulating the way that dew adds moisture to hay, but have to date, had limited success. Spraying water over the top of the windrow has added moisture only to the top surface of the windrow while the rest of the hay remains too dry for baling. Attempts to mechanically move the windrow so that water can be added to the lower surfaces have also proven unsuccessful in that any mechanical handling of a dry windrow shatters the leaves off. The device that has been invented allows for moisture to be added evenly throughout the windrow without moving the windrow.

DESCRIPTION OF THE EMBODIMENTS OF THE INVENTION

The device that has been invented travels over and through a windrow of hay laying in the field, prior to baling the windrow. The device can be alternately pulled by a separate truck or tractor prior to passing through the field with the baler as a separate pass. Or, the device can be attached to the tractor pulling the baler or to the baler itself, so that it passes over and through the windrow prior to baling the windrow.

In FIG. 1, a frame 1 is designed to hold the device supported on wheels 2 that straddle the windrow being treated 3. The frame setup in this fashion can be pulled from hitch point 4, by a tractor operating a separate pass before baling. As an alternative the hitch point 4 can be arranged to fit to the front of the tractor pulling the baler, to the front of a truck or tractor making a separate pass, or to the front of the baler. As an alternative, the frame may be arranged to be pulled to the side of a truck or tractor so that a windrow or multiple windrows adjacent to the vehicle may be the one treated.

A tank 5 is located on the frame I in a position to attain the maximum support. Moisture is added at a rate of 5 to 15 gallon per acre to increase the moisture content of the windrowed alfalfa hay by 3 to 6 percentage points of moisture. Depending on the number of acres to be treated and the availability of refill, the tank is sized between 100 and 2000 gallons. In the case where only a small size tank is required, the wheels 2 may be eliminated and the frame 1 may be sufficient to support the tank when mounted rigidly to a truck or tractor. One or more pivot arms 6 are attached to the frame 1 with a free-moving swivel 7, allowing the arms to travel up and down. A hub 8 is attached to the other end of the pivot arms 6 to hold a horizontal shaft 9 that extends horizontally to a second pivot arm of the preferred embodiment located at a distance sufficient to carry the shaft across the width of a windrow normally between 36 and 60 inches. The shaft 9 is rotates freely in the hub 8 by means of a bearing or bushing. The shaft is hollow to allow for water to be conveyed through it. A separate water line may be attached to the outside of the shaft.

Attached to the shaft 9 are multiple rods 10 that are referred to as spikes. The spikes are of a length sufficient enough to extend from the shaft 9 to within an inch of the ground, usually between 10 and 30 inches. The spikes are hollow so that water can be conveyed through them to their end or a separate water line can be attached to the outside of the spikes. The spikes 10 are fitted with a spray orifice 11 at the end, which sprays water in a wide horizontal pattern 12, usually between as 3 and 12 inch diameter. The spikes are spaced around the center shaft 9 so that the spray pattern from the orifices 11 will just barely overlap from the pattern from the adjacent spike 13. Spikes are spaced longitudinally on the shaft 9 in the same fashion, so that on a shaft that is 48 inches long, with spray orifices providing a 12 inch diameter spray pattern, there will be 4 rows of spikes. Each row in this example, would contain 10 spikes, if they were set at 24 inches long, to maintain the proper spacing.

The spikes that are positioned such that in the lower radius of the groups of rods 10a–e are surrounded by the hay in the windrow 3. As the device travels forward, the spikes within the windrow are held back by the hay, causing the shaft 9 to rotate around the hub 8. The spikes within the windrow will progressively penetrate the hay as they travel on a radius around the shaft 9. The travel of each spike 18, is limited on the lower end by a stop 19 so that the end of the spike comes within an inch of the ground, or all the way to the bottom of the windrow. A spring type means of flotation 20 allows for the shaft to move upward to prevent the spikes from dragging on the ground if the surface becomes uneven. With this spacing and placement of the spikes, all of the hay in the windrow can be evenly covered with water sprayed through the orifices.

The preferred embodiment of the device also provides for a means to turn off water flow to spikes not positioned in the windrow. As the shaft 9 rotates, the spikes are opened up to water flow from the position when they begin to enter the windrow 10 until they leave the windrow at position 17. A valve assembly 21 is positioned at the opening to each row of spikes. A trip mechanism 22 is positioned to open each valve for each row when it rotates to the beginning position 10*a* and then the trip mechanism holds the valve open until it reaches the exiting position 10*e*. To activate the valve, an arm 23 is attached to each valve that operates the valve when depressed. This trip mechanism 22 depresses the valve and is normally constructed in an arc, located adjacent to arms that activate the spike valves 21. The trip mechanism is constructed in a fashion so the beginning and ending points of valve activation are movable to adjust for differing heights of windrows. Movement can be accomplished by using a sliding trip 24 on each end of the arc 23.

One alternative method of treating the outside surface of the windrow is it activate the valves slightly ahead of when they would enter the windrow, allowing for spray coverage on the outside of the windrow. As an alternative, the valves on the spikes can be activated as they enter the windrow and outside coverage can be accomplished by an array of additional spray orifices aimed at the outside surface of the windrow.

As an alternative to using individual valves on each spray tip, a stationary manifold can be mounted to the hub 8 and a rotating manifold can be mounted to the shaft 9. An opening in the stationary manifold is positioned to intersect with the lower rotation of the manifold on the rotating shaft. In individual openings in the rotating shaft intersect with the opening in the stationary manifold in a position so that these individual openings will receive water when the corresponding row of spikes travel between position 10 and 10*a–e*.

In the preferred embodiment, a pump 25 is supplied by water from the tank 5 and conveys to through a line to a swivel 26. When individual valves are used to activate the spikes, the swivel is located between the hub 8 and the shaft 9. Since the orifices are surrounded by hay, when positioned in the windrow, the pump has to provide enough pressure to convey the water sprayed through the hay material. Pressure delivery to the orifice is best at levels in excess of 1500 pounds per square inch.

What is claimed is:

1. A device comprising: a frame of sufficient width and height to travel over a windrow of hay; at least one pivot arm attached to the frame to hold at least one hub, a rotating shaft supported by the at least one hub located above the windrow, horizontal to the ground extending the width of the windrow; an arrangement of hollow spikes attached to the shaft; orifices attached to the end of the spikes so that water sprayed from each spike is delivered in a pattern to intersect from water sprayed from adjacent spikes; a water supply for delivering water to the spikes.

2. A device as in claim 1 further comprising a controller which controls water conveyed to the spikes and permits flow only to the spikes that are in the windrow.

3. A device as in claim 2 where the controller comprises a valve on each spike and a trip mechanism, the valve being activated by the trip mechanism as the valve passes by the trip mechanism.

4. A device as in claim 2 where the controller comprises a stationary manifold with an opening that intersects with individual openings for each spike as they pass by the opening, allowing for flow to the spikes connected to the openings in the intersect position.

5. A device as in claim 1 where the water supply delivers water to the spikes at pressure of at least 1000 pounds per square inch.

6. A device for supplying fluid to an agricultural material laying in-field, comprising a support assembly and a fluid delivery assembly operatively supported by the support assembly, the fluid delivery assembly including a plurality of rotatable spikes disposed about a hub; the spikes contacting the agricultural material in-field and having sprayers for delivering fluid to the material.

7. A device for use with a fluid source to supply fluid to agricultural material lying in a field, comprising:

(a) a frame having a predetermined configuration for relative movement with respect to the agricultural material;

(b) a rotatable shaft supported by the frame, which is disposed a predetermined distance from the agricultural material; and (c) a plurality of spikes connected to the shaft and contacting the agricultural material while the material is lying in the field, the spikes having sprayers adapted to be communicatively coupled to the fluid source and for delivering fluid in a predetermined pattern to the agricultural material.

* * * * *